March 8, 1949. A. SAMSTAG 2,463,567

ELECTRICAL TESTING DEVICE

Filed Aug. 29, 1945 2 Sheets-Sheet 1

Inventor

ADAM SAMSTAG

By Ralph L Chappell

Attorney

March 8, 1949.  A. SAMSTAG  2,463,567
ELECTRICAL TESTING DEVICE
Filed Aug. 29, 1945  2 Sheets-Sheet 2

Inventor
ADAM SAMSTAG
By Ralph L Chappell
Attorney

Patented Mar. 8, 1949

2,463,567

UNITED STATES PATENT OFFICE 2,463,567

ELECTRICAL TESTING DEVICE

Adam Samstag, United States Navy

Application August 29, 1945, Serial No. 613,401

1 Claim. (Cl. 175—183)

(Granted under the act of March 3, 1883, as amended April 30, 1928; 370 O. G. 757)

This invention relates to electrical testing devices and more particularly to a device for testing armatures and field coils for short circuits, open circuits, improper connections, or improper winding.

Heretofore in the testing of the electrical devices and, more particularly, field and armature circuits, it has been customary to employ complicated test apparatus which usually requires the disassembly of the device to be tested so that it may be subjected to the desired test procedures. The present invention provides a small, light and compact pocket style testing device which employs a minimum number of parts and is capable of direct use for test purposes without requiring the disassembly thereof.

An object of the present invention is to provide a fool-proof test instrument which cannot be misapplied or abused by the operator during use to the damage of the instrument or the article being tested.

Another object of the present invention is to provide a device having protruding electrical contacts which are adjustable to engage with separate adjacent segments on the rounded surface of a commutator.

Other objects and advantages will be apparent from the specification and appended drawings in which.

Figure 1:
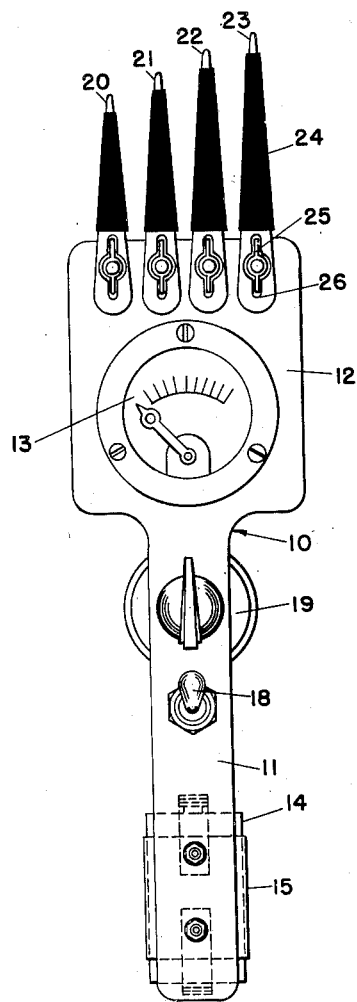
Fig. 1 is a front elevation of a test device constructed in accordance with the present invention.
Figure 2:
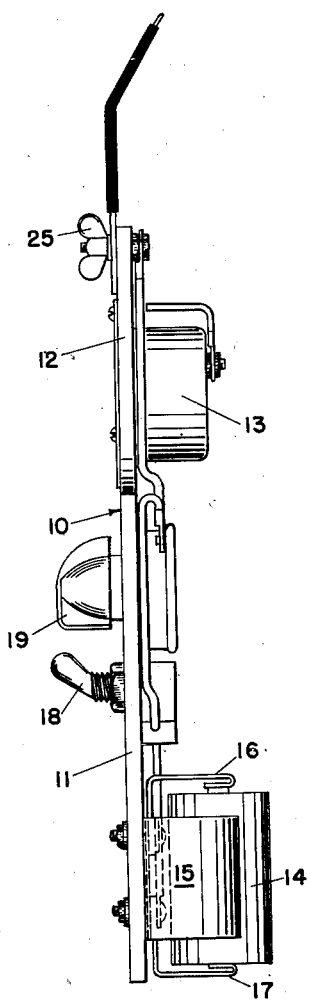
Fig. 2 is a side elevation of the embodiment illustrated in Fig. 1.

Referring to the drawings in detail:

The test instrument comprises a base member 10 preferably formed of some suitable insulating material shaped to provide a handle portion 11 and a head portion 12. In the head portion 12 is located a current indicating meter such as the milliammeter 13 illustrated.

The handle portion of the base in the embodiment illustrated supports a conventional flashlight battery 14 by means of a battery engaging spring clip 15 and an electrical connection is made with the battery terminals by means of a pair of spaced upper and lower contacts 16 and 17.

Above the battery in the handle portion 11 is mounted a switch 18 which may be of the three pole variety or may comprise two separate switches as is hereinafter set forth. Above the switch 18 is a variable rheostat 19.

From the top of the head 12 of the device protrude four spaced prongs 20, 21, 22 and 23, which prongs are preferably formed of a resilient metal and each is provided intermediate its ends with a covering or sheath 24 of insulating material. These prongs are removably secured in place by means of thumb nuts 25 which engage contact screws extending through elongated slots 26 at the base of each prong. The base of the prong is widened and has an axial slot 26 therein to permit axial adjustment of each of the prongs as required in order to accommodate the ends of the prongs to commutators of different diameters.

Figure 3:
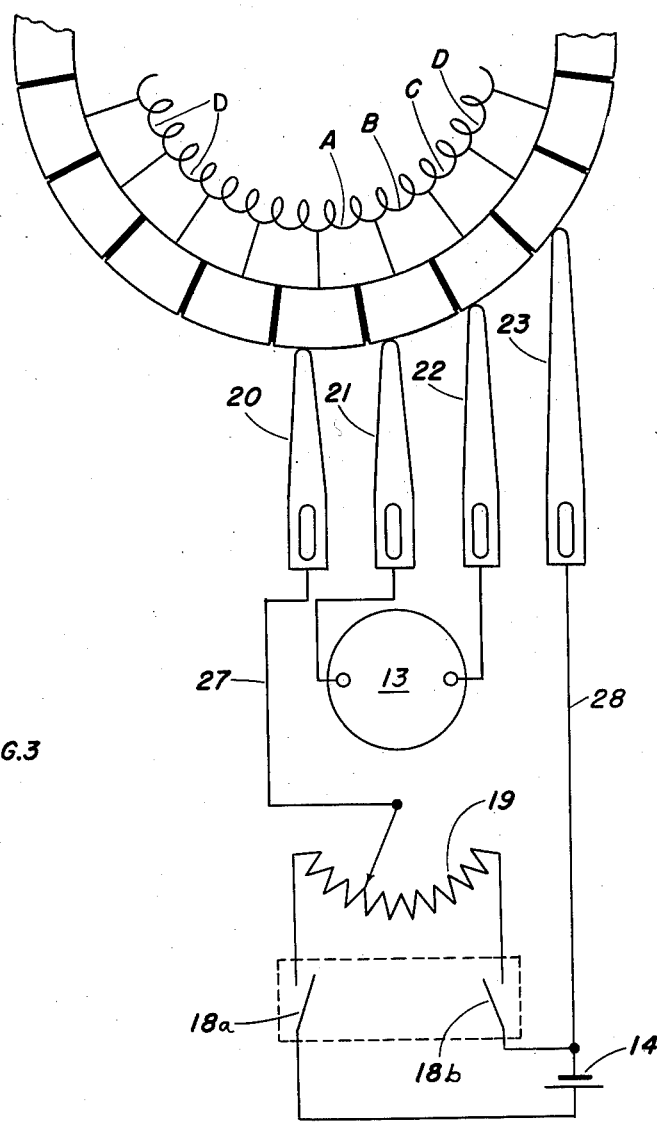
Fig. 3 is a schematic diagram of the electrical circuit employed in the test device of the present invention and illustrates the method of use of the device.

The respective parts are assembled and connected as illustrated in Fig. 3 where a test device constructed in accordance with the present invention is shown in use to test the electrical characteristics of an armature through contact with the commutator thereof.

In use the commutator of the armature to be tested is first made accessible by removal of the inspection plates or other covering and the pronged end of the instrument is then applied so that the tips of the prongs will rest upon four adjacent commutator bars, one for each prong. Adjustment may then be made to vary the length of the prongs as required for the armature diameter. Of course, the resilient nature of the prongs will aid in correcting for any discrepancy from the correct circular contour of the commutator.

The instrument is then held by the operator in a position perpendicular to the commutator and the rheostat 19 is adjusted until a current is flowing through the meter 13 sufficient to give about one-half scale deflection of the meter pointer. This half scale deflection is desirable so that pointer movement in either direction can easily be detected during the test.

With switches 18A and 18B closed (Fig. 3) current will travel through the rheostat 19 and a portion of the current, sufficient to actuate the milliammeter as aforesaid, will pass through wire 27, prong 20, armature coils A, B, and C, and back through the proper commutator bar finger 23, and wire 28 to the battery 14. Any variation in resistance, break or short effecting coil B will show up by a change in the deflection of the milliammeter pointer. Since the resistance of coils A, B, and C, is small compared to all the other windings D in the armature circuit, most of the current will flow through coils A, B, and C, and they will be tested by the device.

Suppose in the above test that either coil A or coil C were open, this would be revealed by the absence of any reading on the milliammeter. If coil B were open, the milliammeter current would be greatly increased. By rotating the armature slowly through a complete revolution the entire armature may be checked and any trouble will be indicated by a deflection from normal on the meter. Once an abnormal deflection is noticed, a consideration of the circuit will make the nature of the trouble apparent. Of course, when the test is completed at least one of the switches 18A and 18B must be left open, else the battery 14 will be shorted through the rheostat 13.

It will be noted that in the above test, no current is used which is of sufficient magnitude to be damaging to the device under test and there is no danger of breaking down insulation by high voltage.

Switches 18A and 18B may be combined in a single three-way switch if desired, in which event it is preferably arranged so that one position closes switch 18A only, another position closes both 18A and 18B and in the third position both switches are open.

In interpreting the test results, it will be apparent that if the milliammeter deflection is uniform throughout the test the coils are in good condition. If, however, abnormal deflection is noticed, a study of the circuit will reveal the nature and location of the trouble.

From the foregoing it will be apparent to those skilled in the art that the present test device is extremely simple in construction and operation and will permit ready test of electrical units without disassembly. Because of its simplicity it may be used by those without extensive electrical experience and as a test to determine the necessity for unit replacement of defective items.

While a particular embodiment of the invention is shown, it will be understood, of course, that it is not desired to be limited and it is, therefore, contemplated by the appended claim to cover any such modifications as fall within the true spirit and scope of this invention.

The invention described herein may be manufactured and used by or for the Government of the United States of America for governmental purposes without the payment of any royalties thereon or therefor.

Having thus described the invention, what is claimed and desired to be secured by Letters Patent is:

An electrical testing instrument of the class described, comprising a handle carrying a source of electromotive force and a device for indicating current intensity, four elongated contact elements extending forwardly from said handle in forklike arrangement, adjustable means securing said elements individually to said handle so that they can be moved axially to position their tips in an arc of predetermined radius, electrical connections from the two outside elements to said source of electromotive force, and further electrical connections from the two inside elements to said device for indicating current intensity.

ADAM SAMSTAG.

REFERENCES CITED

The following references are of record in the file of this patent:

UNITED STATES PATENTS

| Number | Name | Date |
|---|---|---|
| 1,432,003 | West | Oct. 17, 1922 |
| 1,494,232 | Friedly | May 13, 1924 |

OTHER REFERENCES

Electrical World, Aug. 8, 1925, pages 257–259.
Instruments, Dec. 1943, page 758.